United States Patent
Lee (10) Patent No.: US 10,224,128 B2
(45) Date of Patent: Mar. 5, 2019

(54) FLEXIBLE FLAT CABLE, VEHICLE INCLUDING THE SAME, AND METHOD OF MANUFACTURING THE FLEXIBLE FLAT CABLE

(71) Applicant: Hyundai Motor Company, Seoul (KR)

(72) Inventor: Hoseung Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/493,373

(22) Filed: Apr. 21, 2017

(65) Prior Publication Data

US 2018/0174707 A1  Jun. 21, 2018

(30) Foreign Application Priority Data

Dec. 20, 2016  (KR) .................. 10-2016-0174510

(51) Int. Cl.
| | | |
|---|---|---|
| *B60R 16/023* | (2006.01) | |
| *H01B 1/02* | (2006.01) | |
| *H01B 7/04* | (2006.01) | |
| *H01B 13/06* | (2006.01) | |
| *H01B 7/08* | (2006.01) | |
| *H01B 7/18* | (2006.01) | |

(52) U.S. Cl.
CPC ......... *H01B 7/0823* (2013.01); *B60R 16/023* (2013.01); *H01B 1/02* (2013.01); *H01B 7/04* (2013.01); *H01B 7/1805* (2013.01); *H01B 13/06* (2013.01)

(58) Field of Classification Search
CPC ...... H01B 7/0823; H01B 1/02; H01B 7/1805; H01B 13/06; H01B 7/04; B60R 16/023

USPC ....................................... 174/119 R
See application file for complete search history.

(56) References Cited

U.S. PATENT DOCUMENTS

| | | | | |
|---|---|---|---|---|
| 7,198,736 B2* | 4/2007 | Kasuga | .................... | H01B 1/22 252/514 |
| 7,399,929 B2* | 7/2008 | Ueno | .................... | H01B 7/0861 174/117 A |
| 8,063,307 B2* | 11/2011 | Bukshpun | .............. | A41D 1/005 174/102 SC |

(Continued)

FOREIGN PATENT DOCUMENTS

| | | |
|---|---|---|
| JP | 2000-67642 A | 3/2000 |
| JP | 2003-45232 A | 2/2003 |

(Continued)

OTHER PUBLICATIONS

Chaokun Gong et al. A Healable, Semitransparent Silver Nanowire-Polymer Composite Conductor Adv. Mater. 2013, 25, 4186-4191.*

(Continued)

*Primary Examiner* — Michael F McAllister
(74) *Attorney, Agent, or Firm* — Morgan, Lewis & Bockius LLP (57) ABSTRACT

A flexible flat cable and a method of manufacturing the flexible flat cable, may include an insulating film forming an external appearance of the flexible flat cable; a conductor disposed inside the insulating film; and an adhesion layer configured to bond the insulating film to the conductor, wherein the adhesion layer contains metal particles, and when a crack occurs in the conductor, the metal particles connect the conductor in which the crack occurs.

5 Claims, 6 Drawing Sheets

(56) References Cited

U.S. PATENT DOCUMENTS

| | | | | |
|---|---|---|---|---|
| 8,679,621 B2* | 3/2014 | Blaiszik | | H01B 1/02 428/321.5 |
| 2003/0236362 A1* | 12/2003 | Bluem | | C09J 4/00 525/530 |
| 2009/0126970 A1* | 5/2009 | Sasaki | | C08J 5/18 174/110 SR |
| 2009/0126972 A1* | 5/2009 | Matsushita | | H01B 7/0861 174/113 R |
| 2010/0122832 A1* | 5/2010 | Bukshpun | | A41D 1/005 174/110 R |
| 2012/0067615 A1* | 3/2012 | Blaiszik | | H01B 1/02 174/110 R |
| 2012/0138345 A1* | 6/2012 | Amou | | B32B 3/18 174/255 |
| 2013/0206451 A1* | 8/2013 | Arai | | H01B 7/295 174/119 R |
| 2013/0220674 A1* | 8/2013 | Amou | | H05K 3/386 174/251 |
| 2013/0233590 A1* | 9/2013 | Shanai | | C09J 7/02 174/117 F |
| 2014/0158398 A1* | 6/2014 | Shanai | | H01B 3/421 174/117 F |
| 2014/0322522 A1* | 10/2014 | Yoo | | C09J 11/08 428/327 |
| 2016/0163419 A1 | 6/2016 | Sirola et al. | | |
| 2016/0360612 A1* | 12/2016 | Iwase | | H05K 3/225 |

FOREIGN PATENT DOCUMENTS

| | | |
|---|---|---|
| JP | 2008-210584 A | 9/2008 |
| KR | 10-0899107 B1 | 5/2009 |

OTHER PUBLICATIONS

Hao Sun et al. Self-Healable Electrically Conducting Wires for Wearable Microelectronics Angew. Chem. Int. Ed. 2014, 53, 9526-9531.*

* cited by examiner

FLEXIBLE FLAT CABLE, VEHICLE INCLUDING THE SAME, AND METHOD OF MANUFACTURING THE FLEXIBLE FLAT CABLE

CROSS-REFERENCE(S) TO RELATED APPLICATIONS

The present application claims priority to Korean Patent Application No. 10-2016-0174510, filed on Dec. 20, 2016, the entire contents of which is incorporated herein for all purposes by this reference.

BACKGROUND OF THE INVENTION

Field of the Invention

The present invention relate to a flexible flat cable, a vehicle including the same, and a method of manufacturing the flexible flat cable.

Description of Related Art

The number of electronic components used in a vehicle is increasing. Accordingly, the number of signal lines that transmit control signals for controlling the electronic components is also increasing. A flexible flat cable is widely used as the signal lines due to the cable's small volume and high flexibility.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a flexible flat cable capable of restoring the conductivity of a conductor in which a crack occurs using an adhesion layer containing metal particles, a vehicle including the flexible flat cable, and a method of manufacturing the flexible flat cable.

Additional aspects of the invention will be set forth in part in the description which follows and, in part, will be obvious from the description, or may be learned by practice of the invention.

In accordance with an aspect of the present invention, a flexible flat cable includes an insulating film forming the external appearance of the flexible flat cable, a conductor disposed inside the insulating film, and an adhesion layer configured to bond the insulating film to the conductor. The adhesion layer contains metal particles so when a crack occurs in the conductor the metal particles reconnect the conductor in the region which the crack occurs.

When the crack occurs in the conductor the metal particles become molten in the area in which the crack occurs due to the heat generated from an increase in resistance and restore the conductivity of the conductor.

The adhesion layer includes a first adhesion layer disposed to cover the conductor and containing the metal particles, and a second adhesion layer disposed on the upper and lower surfaces of the first adhesion layer configured to bond the insulating film to the conductor.

The first adhesion layer may have a thickness of 10 μm to 500 μm.

The metal particles include particles of at least one metal among nickel, cobalt, gold, silver, and copper, or particles of an alloy of two or more metals of nickel, cobalt, gold, silver, and copper.

Each of the metal particles may have a diameter of 1 μm to 20 μm.

In accordance with an aspect of the present invention, a method of manufacturing a flexible flat cable includes coating the first adhesion layer containing metal particles on a conductor and using a second adhesion layer to bond the insulating film, forming the external appearance of the flexible flat cable, to the upper and lower surfaces of the conductor on which the first adhesion layer is coated.

Use of the second adhesion layer to bond the insulating film forming the external appearance of the flexible flat cable to the upper and lower surfaces of the conductor on which the first adhesion layer is coated includes, putting the second adhesion layer and the insulating film on the upper and lower surfaces of the conductor on which the first adhesion layer is coated, and applying heat and pressure to the insulating film to bond the insulating film to the conductor.

The method further includes washing the surface of the conductor to coat the first adhesion layer on the conductor.

In accordance with an aspect of the present invention, a vehicle includes an electronic apparatus and a flexible flat cable connected to the electronic apparatus configured to transfer an electrical signal. The flexible flat cable includes an insulating film forming the external appearance of the flexible flat cable, a conductor disposed inside the insulating film, and an adhesion layer configured to bond the insulating film to the conductor wherein the adhesion layer contains metal particles, and when a crack occurs in the conductor the metal particles connect the conductor in which the crack occurs.

When the crack occurs in the conductor the metal particles become molten in the area in which the crack occurs, due to the heat generated by an increase in resistance, and restore the conductivity of the conductor.

The adhesion layer includes a first adhesion layer containing metal particles disposed to cover the conductor, and a second adhesion layer disposed on the upper and lower surfaces of the first adhesion layer configured to bond the insulating film to the conductor.

The first adhesion layer may have a thickness of 10 μm to 500 μm.

The metal particles include particles of at least one metal among nickel, cobalt, gold, silver, and copper, or particles of an alloy of two or more metals of nickel, cobalt, gold, silver, and copper.

Each of the metal particles may have a diameter of 1 μm to 20 μm.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalents parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended terms.

The present specification does not describe all components of the embodiments, and general information in the technical field to which the present invention belongs or overlapping information between the embodiments will not be described.

Also, it will be understood that when the terms "includes," "comprises," "including," and or "comprising," when used in the present specification, specify the presence of a stated component, but do not preclude the presence or addition of one or more other components.

It is to be understood that the singular forms "a," "an," and "the" include plural referents unless the context clearly dictates otherwise.

Reference numerals used in operations are provided for convenience of description, without describing the order of the operations, and the operations can be executed in a different order from the stated order unless a specific order is definitely specified in the context.

Hereinafter, a flexible flat cable, a vehicle including the same, and a method of manufacturing the flexible flat cable, according to various aspects of the present invention, will be described in detail with reference to the accompanying drawings.

Figure 1:
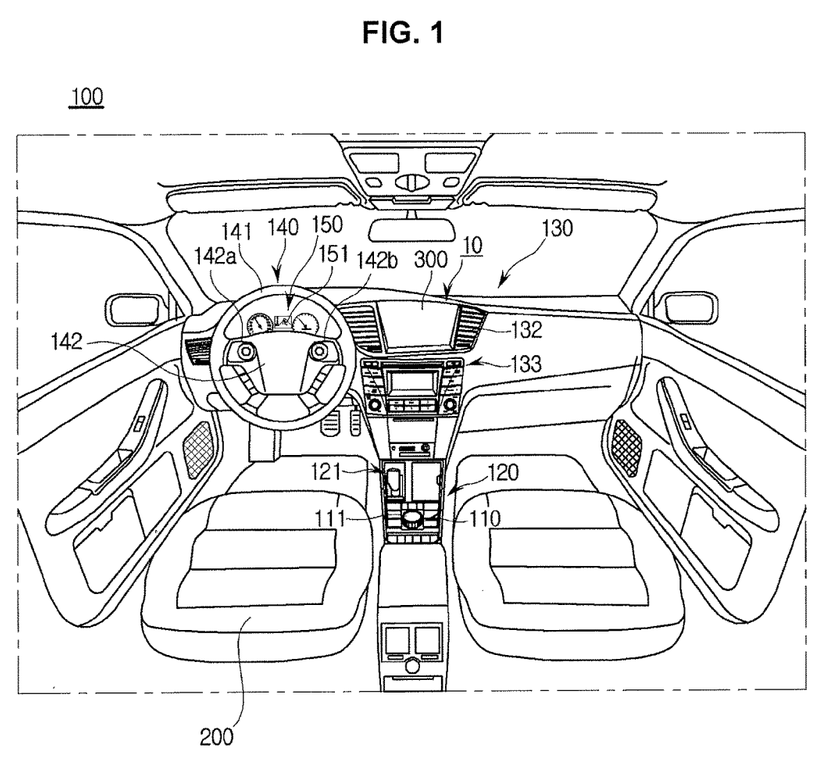
FIG. 1 depicts the internal of a vehicle according to an exemplary embodiment of the present invention.

FIG. 1 depicts the internal of a vehicle according to an exemplary embodiment of the present invention.

As shown in FIG. 1, a vehicle 100 may include a dashboard in which a gear box 120, a center fascia 130, a steering wheel 140, an instrument panel 150, etc. are disposed.

In the gear box 120, a gear lever 121 for shifting gears may be disposed. Also, as shown in FIG. 1, the gear box 120 may include a dial manipulator 111 configured to enable a user to control execution of the functions of navigation system 10 or multimedia system including audio system 133 or the main functions of the vehicle, and an input device 110 including various buttons.

In the center fascia 130, an air conditioner 132, the audio system 133, and the navigation system 10 may be disposed.

The air conditioner 132 may adjust the temperature, humidity, air quality, and flow of air inside the vehicle 100 to maintain the inside of the vehicle 100 pleasant. The air conditioner 132 may be disposed in the center fascia 130, and may include at least one vent for discharging air. In the center fascia 130, at least one button or dial for controlling the air conditioner 132, etc. may be provided. The user, for example, a driver can use the button or dial provided on the center fascia 130 to control the air conditioner 132 of the vehicle. Also, the user can control the air conditioner 132 through the buttons of the input device 110 or the dial manipulator 111 disposed on the gear box 120.

In the center fascia 130, the navigation system 10 may be disposed. The navigation system 10 may be embedded into the center fascia 130 of the vehicle. According to an embodiment, in the center fascia 130 an input device for controlling the navigation system 10 may be disposed. According to another exemplary embodiment, the input device of the navigation system 10 may be disposed at another location instead of the center fascia 130. For example, the input device of the navigation system 10 may be disposed around a display device 300 of the navigation system 10. According to still another exemplary embodiment, the input device of the navigation system 10 may be disposed in the gear box 120.

The steering wheel 140 may be used to adjust the driving direction of the vehicle 100, and may include a rim 141 that is gripped by the driver and a spoke 142 connected to the steering apparatus of the vehicle 100 and connecting the rim 141 to the hub of a rotation shaft for steering. The spoke 142 may include manipulators 142a and 142b for controlling various devices including an audio system, disposed in the vehicle 100. Also, in the dashboard an instrument panel 150 may be disposed to display the speed of the vehicle 100, the revolutions per minute (RPM) of the engine, the volume of remaining fuel, etc. The instrument panel 150 may include an instrument panel display 151 configured to display information related to the state of driving of the vehicle 100 and information related to manipulations of the multimedia system, etc.

The driver may manipulate the above-described various devices disposed in the dashboard to drive the vehicle 100. The vehicle 100 may include, in addition to devices that the driver can manipulate to drive the vehicle 100, various sensors for detecting information about the surroundings of the vehicle 100 required to drive vehicle 100 or the driving information of vehicle 100.

Meanwhile, the vehicle 100 may adopt various kinds of electronic components. As the number of electronic components used in the vehicle 100 increases, the number of signals lines that transmit control signals for controlling the electronic components also increases. A flexible flat cable may be manufactured by attaching an insulating film to both sides of a plurality of stands of conductors using an adhesive. The flexible flat cable may have a small volume and high flexibility. Due to these advantages the flexible flat cable is widely used in a Steering Roll Connector (SRC).

When the flexible flat cable is used in a SRC having a rolling structure with a small radius of rotation, a crack may occur in the conductors as the time of use increases. When a crack occurs in the conductors the conductivity of the conductors may degrade. To resolve the problem a flexible flat cable, according to an exemplary embodiment of the present invention, is provided. Hereinafter, the embodiment will be described with reference to FIG. 3 to FIG. 7.

Figure 2:
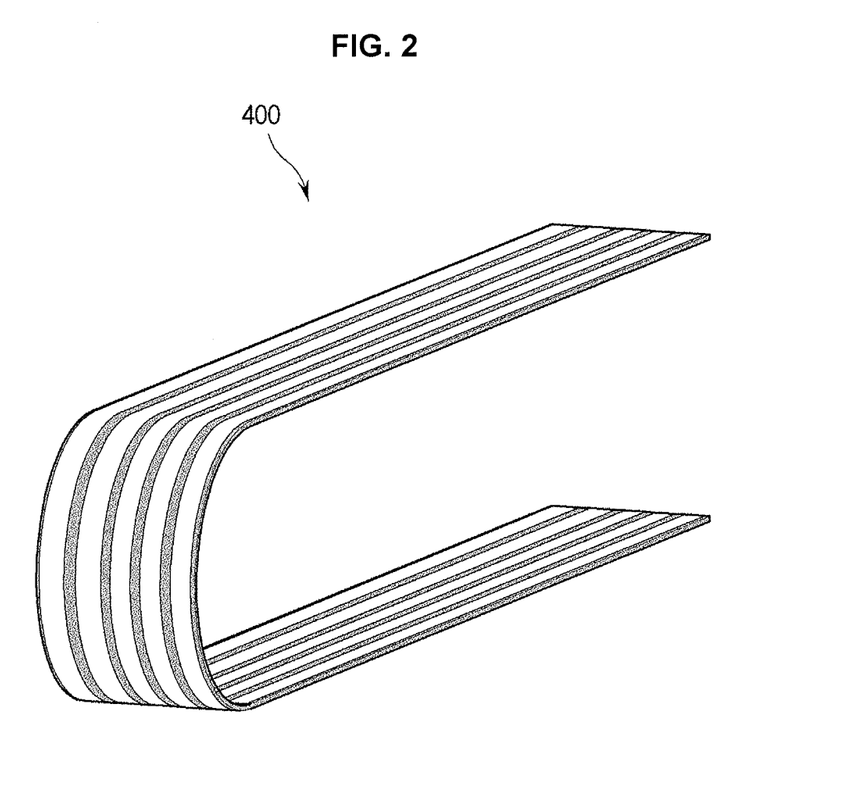
FIG. 2 is a perspective view of a flexible flat cable according to an exemplary embodiment of the present invention.
Figure 3:
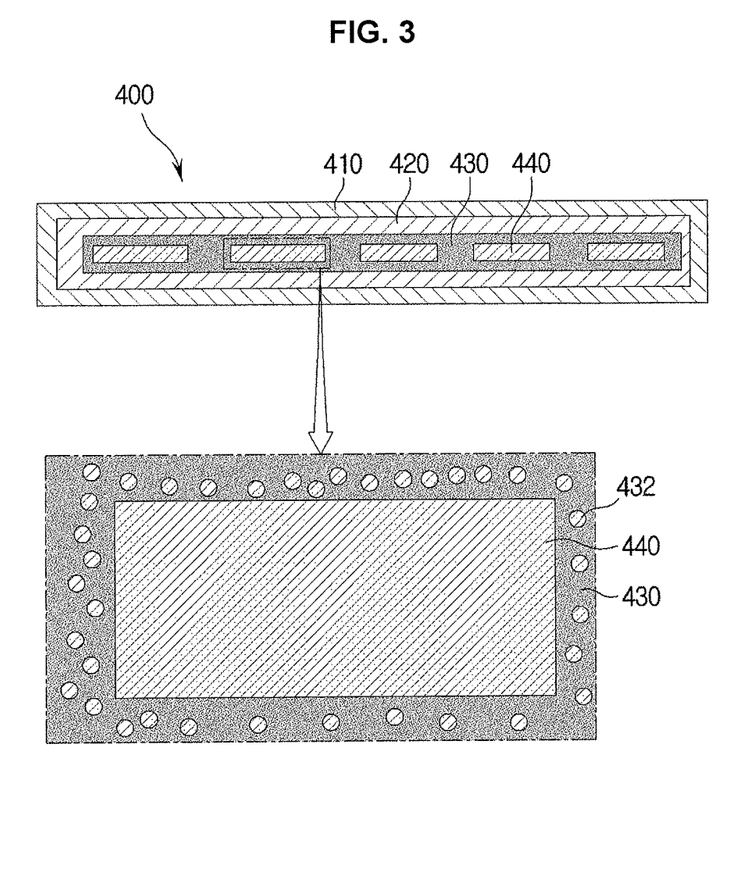
FIG. 3 is a cross-sectional view of the flexible flat cable according to an exemplary embodiment of the present invention.
Figure 4:
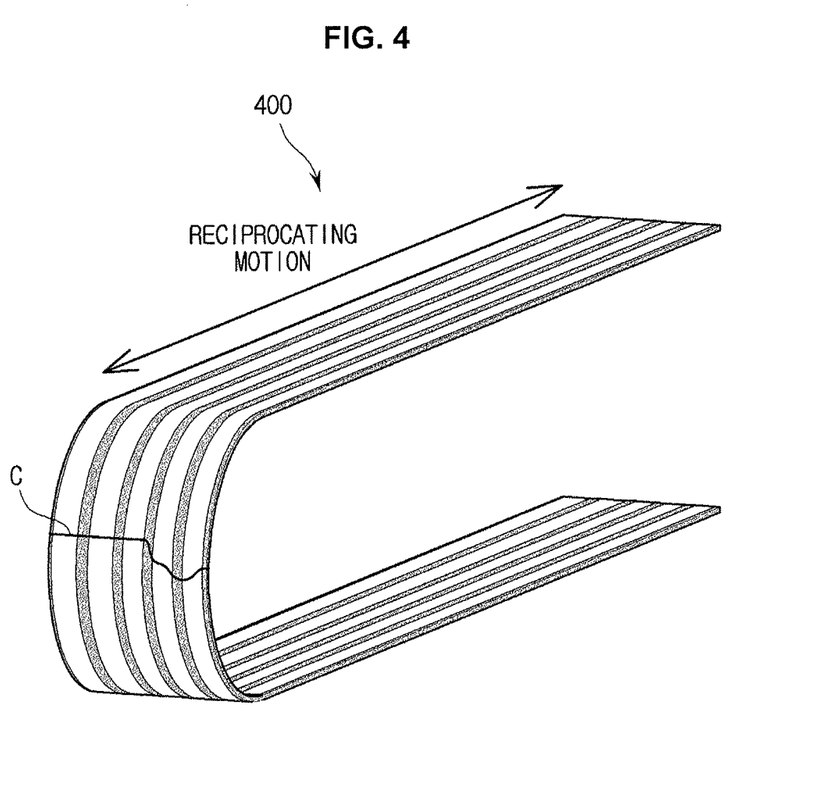
FIG. 4 is a view conceptually depicting a crack which occurred in the flexible flat cable according to an exemplary embodiment of the present invention.
Figure 5:
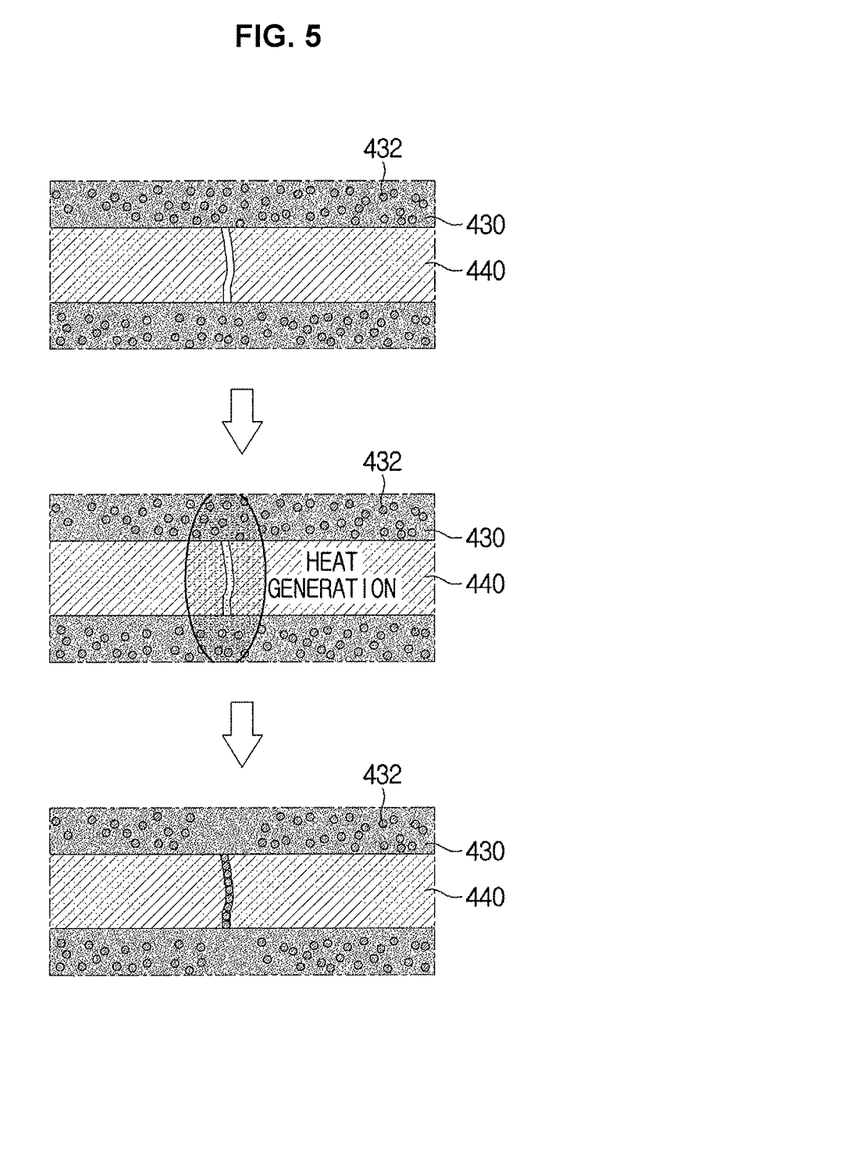
FIG. 5 is a view for describing a method of filling a crack of the flexible flat cable according to an exemplary embodiment of the present invention.
Figure 6:
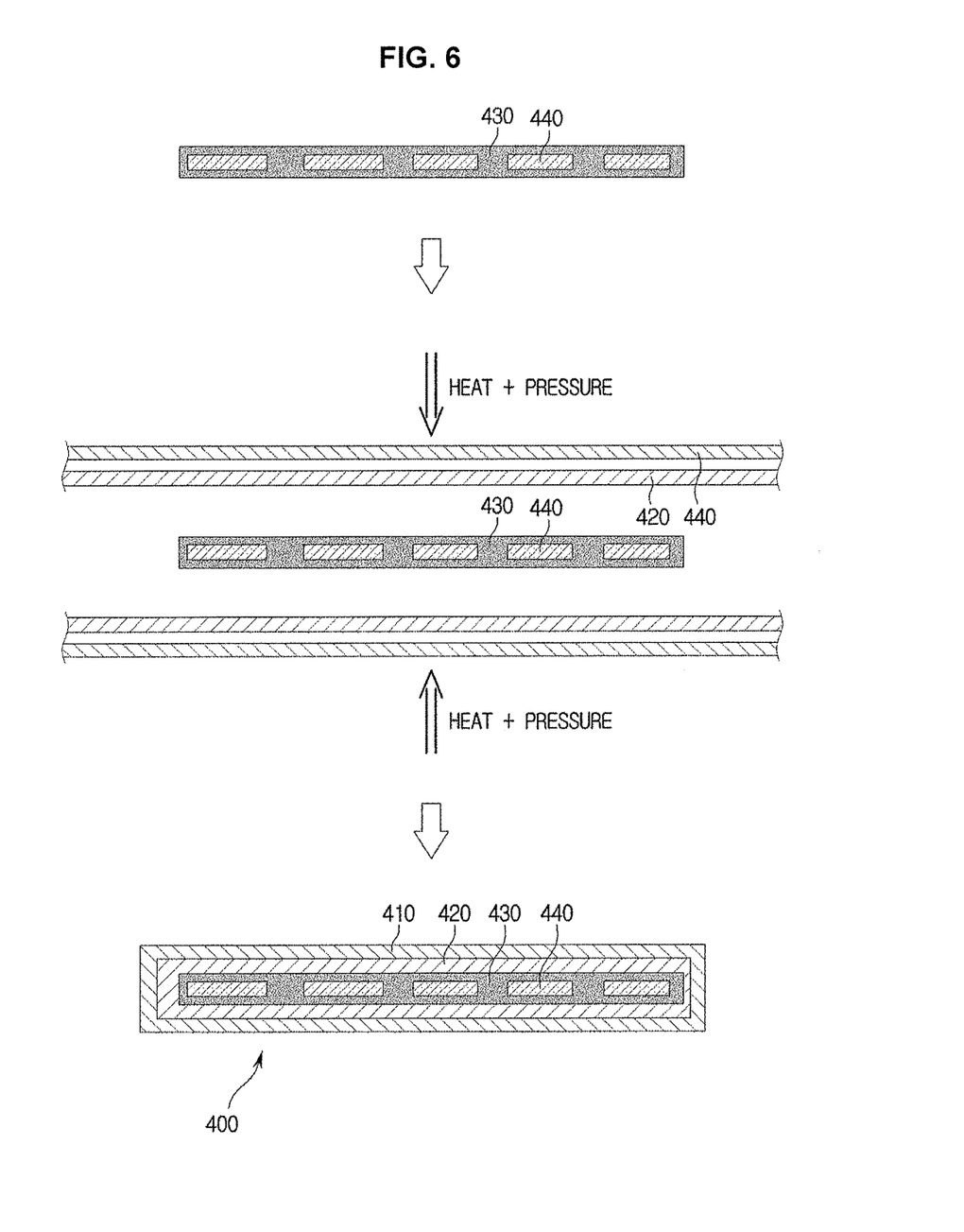
FIG. 6 is a view for describing a method of manufacturing the flexible flat cable according to an exemplary embodiment of the present invention.

FIG. 2 is a perspective view of a flexible flat cable according to an exemplary embodiment of the present invention, and FIG. 3 is a cross-sectional view of the flexible flat cable according to an exemplary embodiment of the present invention. FIG. 4 is a view conceptually depicting a crack in the flexible flat cable according to an exemplary embodiment of the present invention. FIG. 5 is a view for describing a method of filling a crack of the flexible flat cable according to an exemplary embodiment of the present invention. FIG. 6 is a view for describing a method of manufacturing the flexible flat cable according to an exemplary embodiment of the present invention.

As shown in FIG. 2, a flexible flat cable 400 according to an exemplary embodiment of the present invention may have a curved shape since it has flexibility. As shown in FIG. 3, the flexible flat cable 400 according to the current embodiment may include an insulating film 410 forming the external appearance of the flexible flat cable 400, a plurality of conductors 440 to transfer electrical signals, a second adhesion layer 420 to bond the insulating film 410 to the conductors 440, and a first adhesion layer 430 surrounding the conductors 440 and containing metal particles 432.

The conductors 440 may be formed of tough pitch copper or oxygen-free copper, although the material is not limited to these examples.

The conductors 440 may be a plurality of pieces that are separated apart from each other, as shown in FIG. 2 and FIG. 3, wherein the respective conductors 440 may have different widths and thicknesses. For example, the conductors 440 may be implemented as copper foil conductors each having a width of 0.1 mm to 2 mm and a thickness of 0.015 mm to 50 mm.

The insulating film 410 may form the external appearance of the flexible flat cable 400, and may be formed of a resin including a fluoride resin, a polyimide resin, a polyethylene phthalate (PET) resin, an epoxy resin, and the like, although not limited to these materials.

The adhesive for bonding the insulating film 410 to the conductors 440 may be formed of a material containing a resin including polyvinyl butyral, resol-type phenol, melamin, epoxy, and the like. The second adhesion layer 420 may use the adhesive formed of the above-mentioned material.

The first adhesion layer 430 may be formed of a material produced by mixing the metal particles 432 with the adhesive formed of the above-mentioned material. That is, an adhesive obtained by adding the metal particles 432, each having a diameter of 1 μm to 20 μm, when producing the adhesive may be used as the first adhesion layer 430. The metal particles 432 contained in the first adhesion layer 430 may include particles of at least one metal among nickel, cobalt, gold, silver, and copper, or particles of an alloy of two or more metals of nickel, cobalt, gold, silver, and copper, although not limited to these materials.

The first adhesion layer 430 may cover all of the upper, lower, and side surfaces of the conductors 440, or may cover the entire surface of the flexible flat cable 400, like the second adhesion layer 420. Alternatively, the first adhesion layer 430 may be formed in a portion of the flexible flat cable 400 that is expected to have low durability, like the curved portion of the flexible flat cable 400.

As shown in FIG. 4, in the portion of conductors 440 having a small radius of curvature, a crack C may occur when fatigue is accumulated due to reciprocating motions which creates a disconnect in the conductors 440. When crack C occurs, the conductors 440 may fail to transfer electrical signals to the electronic components.

As shown in FIG. 5, when an electrical signal is applied to the flexible flat cable 400 when crack C occurs in the conductors 440 a potential difference may be formed at both end portions of the crack C, and resistance may increase sharply in the area in which crack C occurs.

The metal particles 432 contained in the first adhesion layer 430 may move toward the crack C due to the potential difference formed at both end portions of crack C. Also, the sharp increase in resistance generated in the crack C may generate heat, and the metal particles 432 moved to the crack C may become molten by the heat generated in crack C. Then, crack C which occurred in the conductors 440 may be filled with the molten metal particles 432 moved to the crack C, so that the conductivity can be restored.

Accordingly, the flexible flat cable 400, according to the current embodiment, can restore the conductivity lost by crack C in conductors 440, and extend the lifecycle of cable 400, since crack C can be filled with the metal particles 432 contained in the first adhesion layer 430.

Hereinafter, a method of manufacturing the flexible flat cable 400 according to the current embodiment will be described.

Referring to FIG. 6, first, the first adhesion layer 430 containing metal particles 432 may be coated on the plurality of conductors 440. As described above, since the first adhesion layer 430 containing the metal particles 432 needs to surround the entire surface of conductors 440, the first adhesion layer 430 may be formed to be coated on the conductors 440. Before the first adhesion layer 430 is coated on the conductors 440 the surfaces of the conductors 440 may be washed. The surfaces of the conductors 440 may be washed by a degreasing or plasma processing.

When the surfaces of the conductors 440 are completely washed the conductors 440 may be disposed at predetermined intervals and the first adhesion layer 430 may be coated. The first adhesion layer 430 may be formed with a thickness of 10 μm to 500 μm.

The first adhesion layer 430 may be formed of a material produced by mixing the metal particles 432 with the adhesive formed of the above-described material. That is, an adhesive obtained by adding the metal particles 432, each having a diameter of 1 μm to 20 μm, when producing the adhesive may be used as the first adhesion layer 430. The metal particles 432 contained in the first adhesion layer 430 may include particles of at least one metal among nickel, cobalt, gold, silver, and copper, or particles of an alloy of two or more metals of nickel, cobalt, gold, silver, and copper.

The first adhesion layer 430 may cover the entire surface of the flexible flat cable 400, like the second adhesion layer 420. Alternatively, the first adhesion layer 430 may be disposed in a portion of the flexible flat cable 400 that is expected to have low durability, like the curved portion of the flexible flat cable 400.

After the first adhesion layer 430 is formed on the surface of the conductors 440, the second adhesion layer 420 and the insulating film 410 may be applied to the upper and lower surfaces of the conductors 440 on which the first adhesion layer 430 is coated. A laminating process of applying pressure and heat to the insulating film 410 may be performed to bond the insulating film 410 to the conductors 440, manufacturing the flexible flat cable 400.

The flexible flat cable according to an exemplary embodiment of the present invention can restore the conductivity of the conductors even when a crack occurs in the conductors.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "forwards" and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A flexible flat cable comprising:
   an insulating film forming an external appearance of the flexible flat cable;
   a conductor disposed inside the insulating film; and
   an adhesion layer configured to bond the insulating film to the conductor,
   wherein the adhesion layer contains metal particles, and when a crack occurs in the conductor, the metal particles are configured to connect the conductor in which the crack occurs,
   wherein the metal particles include particles of one metal among nickel and cobalt, or particles of an alloy of two metals of nickel and cobalt.

2. The flexible flat cable according to claim 1, wherein the adhesion layer includes:
   a first adhesion layer disposed to cover the conductor, and containing the metal particles; and
   a second adhesion layer enclosing the first adhesion layer, and configured to bond the insulating film to the conductor.

3. The flexible flat cable according to claim 2, wherein the first adhesion layer has a thickness of 10 μm to 500 μm.

4. The flexible flat cable according to claim 1, wherein the metal further includes silver.

5. The flexible flat cable according to claim 1, wherein each of the metal particles has a diameter of 1 μm to 20 μm.

* * * * *